United States Patent [19]

Sato

[11] 3,765,684

[45] Oct. 16, 1973

[54] AUTOMATIC CASSETTE TAPE RECORDER

[75] Inventor: Masaaki Sato, Tokyo, Japan

[73] Assignee: Olympus Optical Co., Ltd., Tokyo, Japan

[22] Filed: Sept. 9, 1970

[21] Appl. No.: 70,864

[30] Foreign Application Priority Data

Sept. 11, 1969 Japan....................44/71625
Sept. 11, 1969 Japan....................44/71626

[52] U.S. Cl. .................... 274/4 F, 274/4 E

[51] Int. Cl. .................... G11b 23/12

[58] Field of Search .................... 352/6–8, 352/123, 72–74; 353/15, 19; 242/180, 181, 197–200; 179/100.2 Z; 274/4 F

[56] References Cited

UNITED STATES PATENTS

| | | | |
|---|---|---|---|
| 3,589,733 | 6/1971 | Piotrowski | 274/4 F |
| 3,598,339 | 8/1971 | Saito | 274/4 E |
| 3,584,879 | 6/1971 | Ban | 274/4 F |
| 3,477,726 | 11/1969 | Laschenski | 274/4 F |
| 3,463,580 | 8/1969 | Freudenschusz | 274/4 F |
| 3,582,082 | 6/1971 | Takagi | 274/4 F |
| 3,289,962 | 12/1966 | Gellenthin | 274/4 F |

*Primary Examiner*—Louis R. Prince
*Assistant Examiner*—Dennis A. Dearing
*Attorney*—Kelman and Berman

[57] ABSTRACT

A cassette-type tape recorder which can automatically load cassettes from a stack, play them, and then reject them into another stack. In one embodiment, an electric motor drives a lever which alternately permits a cassette to drop under the influence of gravity, onto the tape deck, and then pushes it down into the recorder for play. After the tape has been played, the same lever ejects the cassette and then pushes it into a reject stack. The motor may be actuated manually, or conductive metal tape may be placed inside the cassette to actuate the lever, at the end of play, automatically.

5 Claims, 15 Drawing Figures

INVENTOR

Masaaki Sato

BY Kelman and Berman, agents

INVENTOR
Masaaki Sato
BY
Kelman and Berman,
Agents

INVENTOR
Masaaki Sato
BY Kelman and Berman
Agents

INVENTOR
Masaaki Sato
BY Kelman and Berman,
agents

INVENTOR
Masaaki Sato
BY
Kelman and Berman,
Agents

INVENTOR
Masaaki Sato
BY Kelman and Berman
Agents

INVENTOR
Masaaki Sato
BY Kelman and Berman,
Agents

AUTOMATIC CASSETTE TAPE RECORDER

BACKGROUND OF THE INVENTION

The present invention relates to a device for automatically interchanging tape cassettes in a tape recorder and more particularly to a device for automatically supplying a tape cassette to a tape recorder after the operation of the preceding tape cassette has been completed or stopped at will during the operation thereof.

Heretofore, a tape recorder has been proposed in which a movable cassette supporting deck biased toward the outside of the tape recorder by spring means is provided and a tape cassette loaded thereon is depressed toward the inside of the tape recorder together with the deck to its operative position against the action of the spring means and releasably locked at its operative position by a plurality of guide pins for the operation of the tape cassette.

In such a tape recorder, however, the tape cassette must be removed from the tape recorder by manually releasing the locking of the tape cassette by the guide pins each time the operation of the tape cassette has been completed or stopped at will during the operation thereof and a new cassette must be manually loaded on the supporting deck and depressed to its operative position, thereby requiring a troublesome manual operation for the operation of the tape cassettes.

The present invention aims at avoiding the disadvantages of the prior art tape recorder as described above.

SUMMARY OF THE INVENTION

The object of the present invention is to provide a novel and useful device for automatically interchanging tape cassettes in a tape recorder of the type described above.

To accomplish the above object, one embodiment of the invention comprises a cassette-type tape recorder including a spring-biassed, moveable tape deck for receiving the tape cassette to be played. The recorder includes a cassette supplying station in which a plurality of unplayed cassettes are stacked. The cassettes are dispensed by gravity, or under spring tension, onto the tape deck under control of a transporting mechanism which first forces the tape cassette down into the recorder and then, after it has been played, removes it from the recorder and ejects it into a reject stack. The transporting mechanism then permits the next cassette in the unplayed stack to fall down onto the tape deck and the process is repeated until all the cassettes have been played.

The interchanging of the tape cassettes may be effected either by manually operating the operating knob provided in the tape recorder or by fully automatically without requiring any manual operation of the operating knob.

DETAILED DESCRIPTION OF THE PREFERRED EMBODIMENTS

Figure 7:
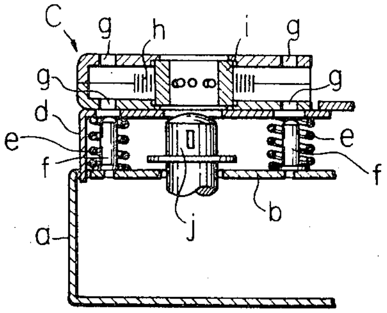
FIG. 7 is a fragmentary sectional view of the tape recorder to be used with the device of the present invention.

Referring to FIG. 7, the tape recorder to be used with the device of the present invention comprises main body a having chassis *b* located below the upper wall of main body *a*, movable cassette supporting deck *d* located on chassis *b* vertically between the uppermost inoperative position of the tape cassette abutting against the lower surface of the upper wall of main body a and the lowermost operative position of the tape cassette moved downwardly onto chassis *b*, driving spindles *j* for driving the tape reels of the cassette, a plurality of guide pins *f* secured to chassis *b* and passing through holes formed in deck *d* for guiding the vertical movement of the same, and compression springs *e* located around the respective guide pins *f* between the lower surface of deck *d* and the upper surface of chassis *b* for normally urging cassette supporting deck d upwardly to the inoperative position of the tape cassette loaded thereon.

Tape cassette *c* used with the tape recorder shown in FIG. 7 comprises rotatable tape reels *i* located in the casing of the cassette on which tape *h* is wound and unwound for the operation thereof by means of a capstan (not shown) and a reproducing head (not shown) of the tape recorder and guide holes *g* in the casing of cassette c for receiving guide pins *f*. Tape reels *i* are provided with holes, respectively for fitting with spindles *j* of the tape recorder so as to be driven thereby when cassette *c* is loaded on the tape recorder in its operative position.

In operation, cassette *c* is first loaded on deck *d* with guide holes *g* aligned with the respective guide pins *f* and depressed downwardly together with deck *d* against the action of springs *e* to the operative position of cassette *c*. When cassette *c* is located and held in its operative position on the tape recorder, an electric source (not shown) is connected to the electric circuit of the tape recorder (not shown) for the operation of the tape recorder. The electric source is automatically disconnected from the electric circuit of the tape recorder when cassette *c* is moved to its inoperative position so as to deenergize the reproducing head, the capstan and the driving spindle.

Figure 1:
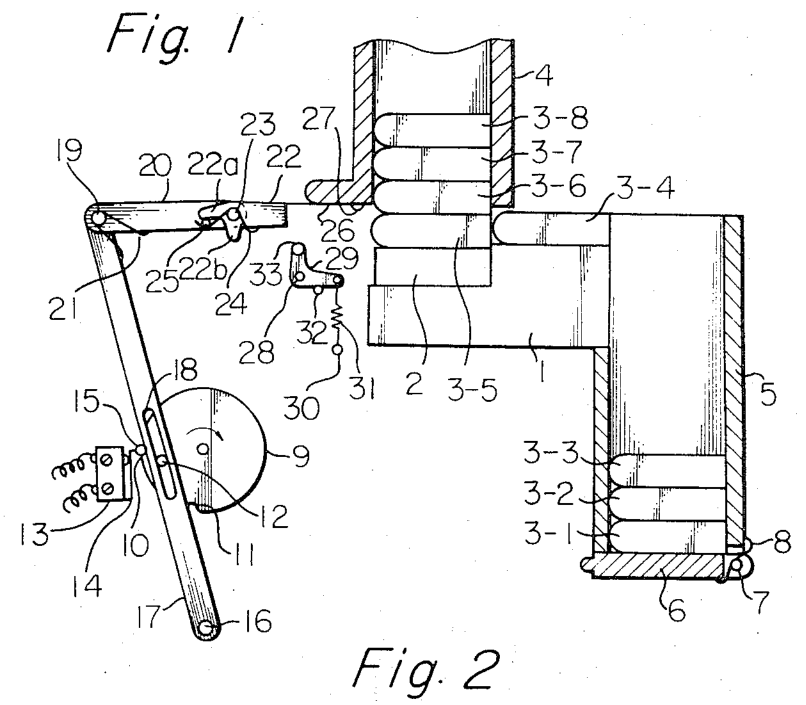
FIG. 1 is a schematic sectional view showing the general arrangement of a first embodiment of the device of the present invention.

In FIG. 1, tape recorder 1 corresponds to the tape recorder shown in FIG. 7 and is provided with movable cassette supporting deck 2 corresponding to deck *d* shown in FIG. 7. The first embodiment of the present invention shown in FIG. 1 comprises a cassette supplying station 4 in the form of a vertical cylinder of rectangular cross-section located above the deck 2 with the outlet thereof in alignment with deck 2. A plurality of tape cassette 3 – 5, 3 – 6, — are located in supplying station 4 in stacked relationship. A cassette receiving station 5 in the form of a vertical cylinder of rectangular cross-section is located behind the tape recorder as shown with the inlet thereof located in a position to receive cassette 3 – 4 which has been used. The used cassettes 3 – 1, 3 – 2, — are shown received in the receiving station 5 on operable bottom plate 6 of station 5 pivoted at pivot shaft 7. A spring 8 is provided around pivot shaft 7 with the ends thereof abutting against plate 6 and the side wall of station 5 so that plate 6 is normally held in closed position. Cassettes 3 – 1, 3 – 2, — can be taken out of station 5 by opening bottom plate 6 against the action of spring 8.

The cassette transporting mechanism of the present invention shown in FIG. 1 comprises a cam disc 9 driven by motor M shown in FIG. 5 to be described later. Recesses 10 and 11 are formed in the outer periphery of disc 9 and a microswitch 13 is located adjacent to the outer periphery of disc 9 so that roller 15 mounted on the free end of operating lever 14 of microswitch 13 is biased against the outer periphery of disc 9. Microswitch 13 is normally held in closed position when roller 15 contacts with the outer periphery of disc 9 but, when roller 15 falls in either of recesses 10, 11 of disc 9 as it rotates, microswitch 13 is opened.

Figure 5:
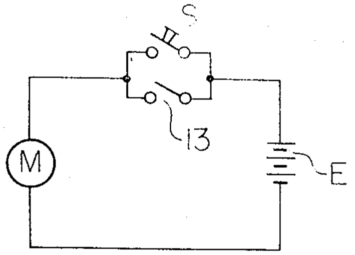
FIG. 5 is a diagram showing the control circuit used with the electric motor in the device shown in FIG. 1.

As shown in FIG. 5, motor M is connected to electric source E through microswitch 13 so that motor M is driven when microswitch 13 is closed. A manually operable switch S provided in the tape recorder is connected in parallel to microswitch 13 so that motor M is also driven when switch S is manually closed even through microswitch 13 is held opened, i.e., when roller 15 of microswitch 13 falls in either of recesses 10, 11 in disc 9.

Disc 9 fixedly mounts thereon a pin 12. A swingable lever 17 pivoted at pivot shaft 16 is provided with elongated hole 18 in which pin 12 of disc 9 is slidably fitted so that lever 17 is reciprocally swung about its pivot shaft 16 as disc 9 is rotated by motor M.

An actuating lever 20 is pivotally connected at its one end to the free end of lever 17 by means of pivot shaft 19 secured to the free end of lever 17 or the one end of lever 20 and a relatively weak spring 21 is provided around pivot shaft 19 with the ends thereof abutting against lever 17 and lever 20, respectively, so that lever 20 is normally biased in the anticlockwise direction about pivot shaft 19.

A cassette transporting lever 22 is pivotally mounted at its one end on the free end of actuating lever 20 by means of pivot shaft 23 and a spring 24 stronger than spring 21 and provided around pivot shaft 23 normally biases lever 22 in the anticlockwise direction around pivot shaft 23. Lever 22 is provided with a projection 22*a* extending substantially lengthwise of lever 22 from the one end thereof and a projection 22*b* extending from the one end of lever 22 substantially perpendicular to the length of lever 22. A pin 25 is fixedly secured to lever 20 so that the anticlockwise rotation of lever 22 is limited by the abutment of pin 25 against projection 22*a* of lever 22. A leaf spring 26 having a semi-spherical projection 27 at the free end thereof is mounted on lever 22 so as to extend from the free end of lever 22.

An L-shaped lever 29 is pivotally mounted in the tape recorder about pivot shaft 28 and one end of spring 31 is secured to the free end of the lower arm of lever 29 and the other end of spring 31 is secured to a stationary point 30 in the tape recorder so that L-shaped lever 29 is normally biased in the clockwise direction about pivot shaft 28. Pin 32 secured to the tape recorder serves to limit the clockwise rotation of lever 29 as shown.

Figure 3:
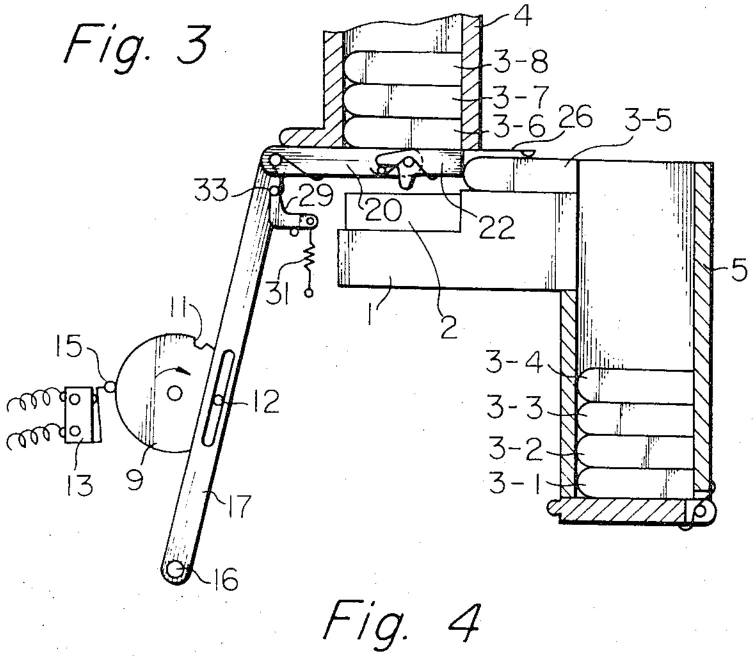

A roller 33 is mounted on the free end of the upper arm of L-shaped lever 29 and the position of roller 33 is so selected that projection 22*b* of lever 22 abuts against roller 33 so that lever 22 is rotated in the clockwise direction when swingable lever 17 is swung toward the right by the rotation of disc 9, and projection 22*b* of lever 22 rides over and beyond roller 33 as lever 17 is swung toward its rightmost position so that lever 22 is now rotated in the anticlockwise direction by spring 24 until the rotation of lever 22 is stopped by the abutment of pin 25 of lever 20 against projection 22*a* of lever 22. At the rightmost position of lever 17, the free end of lever 22 is flush with the right-hand end of stacked cassettes 3 – 6, 3 – 7, — as shown in FIG. 3, while, at the leftmost position of lever 17, the free end of spring 26 is clear from the outlet of cassette supplying station 4 as shown in FIG. 1.

In operation starting at the position shown in FIG. 1 wherein the operation of cassette 3 – 4 has been terminated and removed from deck 2 toward cassette receiving station 5 and succeeding cassette 3 – 5 ls located on deck 2 for the operation thereof and microswitch 13 is opened by the location of roller 15 within recess 10 of cam disc 9.

By manually closing switch S (FIG. 5), motor M is energized to rotate cam disc 9 in the direction indicated by the arrow in FIG. 1 so that roller 15 is moved out of recess 10 and microswitch 13 is closed thereby continuing the energization of motor M and the rotation of cam disc 9 even though switch S is opened until roller 15 falls into recess 11 of disc 9 to open microswitch 13.

Figure 2:
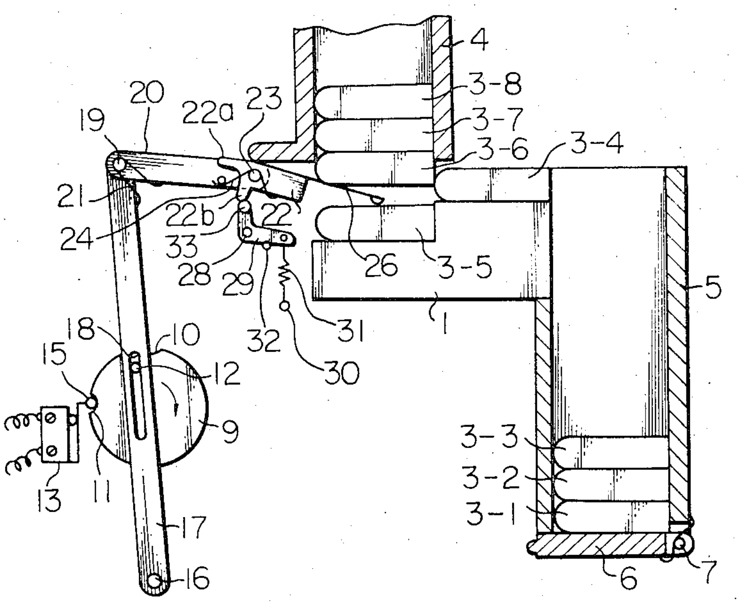
FIGS. 2 to 4 are views similar to FIG. 1 but showing the device in its different phases of the operation thereof, respectively.

As disc 9 rotates, lever 17 is swung toward the right as shown in FIG. 2 and spring 26 is moved between cassette 3 – 5 loaded on deck 2 and cassette 3 – 6 and roller 33 of L-shaped lever 29 abuts against projection 22b of lever 22 so that lever 22 is rotated in the clockwise direction against the action of spring 24 as shown in FIG. 2 so as to urge cassette 3 – 5 downwardly to its operative position on the tape recorder together with deck 2 by projection 27 of spring 26 secured to lever 22 thereby permitting the tape recorder to be operated as previously described, while, at the same time, roller 15 of microswitch 13 falls into recess 11 of disc 9 so that microswitch 13 is opened to deenergize motor M and maintain disc 9 stationarily thereby permitting microswitch 13 to be kept opened and the tape recorder to continue the operation thereof.

When the operation of cassette 3 – 5 has been terminated or when it is desired to terminate the operation of cassette 3 – 5 during the operation thereof, switch S is again closed manually so that motor M is energized to rotate disc 9 thereby permitting microswitch 13 to be closed so as to continue the rotation of disc 9, because roller 15 is moved out of recess 11 of disc 9 to close microswitch 13. At the same time, a switch (not shown) which is coupled with switch S deenergizes the operation of the tape recorder. Therefore, the cassette transporting device is returned to the position shown in FIG. 1 after it assumes the positions shown in FIGS. 3 and 4.

Figure 4:
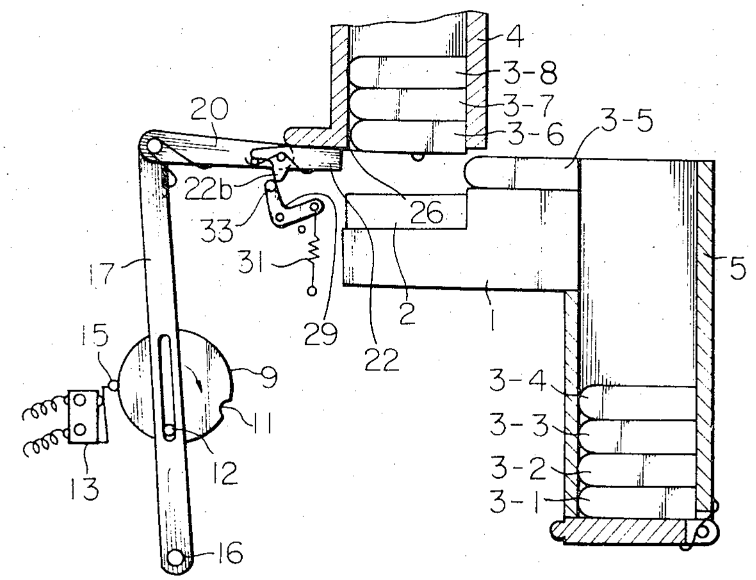

As seen from FIGS. 2 and 3, as lever 17 is swung toward the right beyond the position shown in FIG. 2, projection **22*b* rides over and beyond roller 33 of lever 29 so that lever 22 together with spring 26 is rotated in the anticlockwise direction by the action of spring 24 thereby permitting cassette 3 – 5 to be moved upwardly to its inoperative position by the action of deck 2. Therefore, cassette 3 – 5 is brought to the position in alignment with the free end of lever 22 thereby permitting cassette 3 – 5 to be moved rightward out of deck 2 as lever 17 is swung to its rightmost position shown in FIG. 3 so that preceding cassette 3 – 4 is moved into cassette receiving station 5 so as to be stacked on the preceding cassettes. As disc 9 further rotates, lever 17 is swung toward the left as shown in FIG. 4 and projection 22b of lever 22 abuts against roller 33 of lever 29 and rotates the same in the anticlockwise direction against the action of spring 31 so that projection 22*b* rides over roller 33 and is returned to the initial position shown in FIG. 1 in which spring 26 is moved out of the outlet of cassette supplying station 4 thereby permitting succeeding cassette 3 – 6 to be placed on deck 2 in like manner as shown in FIG. 1 in which cassette 3 – 5 is placed on deck 2**.

By the operation of switch S, the tape cassettes can be successively interchanged.

When it is desired not to operate a cassette directly succeeding the preceding one but to operate a cassette following the cassette which is not desired to be operated, it is merely necessary to continue to close switch S until roller 15 has passed beyond recess 11 of disc 9.

In order to detect the fact that roller 15 has passed over recess 11 of disc 9, a pilot lamp or a buzzer may be provided which is coupled with the rotation of cam disc 9 so as to be energized when roller 15 has passed over recess of disc 9.

Figure 6:
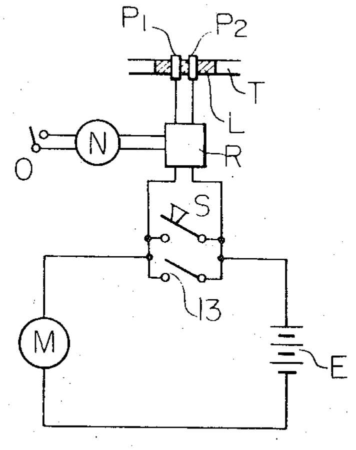
FIG. 6 is a diagram showing a modification of the control circuit of FIG. 5 by which the fully automatic interchanging of the tape cassettes is effected.

FIG. 6 shows a modification of the electric circuit of FIG. 5 by which the tape cassettes can be fully automatically interchanged in the tape recorder by a single operation of switch S at the start of the operation.

In this case, electrically conductive portion L is provided at the ends of tape T contained in the tape cassette. The device for automatically interchanging the tape cassettes is provided with a pair of sensing elements $P_1$, $P_2$ adapted to contact with tape T in the cassette when it is loaded in the tape recorder in its operative position. Sensing elements $P_1$, $P_2$ are connected to the input of an amplifying relay circuit R, the output of which is connected to the respective terminals of microswitch 13 connected in the circuit of motor M and electric source E similar to that shown in FIG. 5. A timer or delay circuit N rendered to be operative by switch 0 connected thereto is connected to amplifying relay circuit R.

Prior to operation, switch 0 is closed so as to bring delay circuit N to its operative position. For operation, it is merely necessary to close switch S once.

The operation of the circuit of FIG. 6 is as follows.

In operation of the tape recorder as shown in FIG. 2, electrically conductive portion L of tape T comes to contact with sensing elements $P_1$, $P_2$ at the end of the operation of the cassette so that elements $P_1$, $P_2$ are short-circuited to actuate amplifying relay circuit R so as to energize motor M thereby actuating the device so that it returns to the position shown in FIG. 1, through the positions shown in FIGS. 3 and 4, as previously described.

Timer or delay circuit N serves to maintain the signal generated by the short-circuiting of elements $P_1$, $P_2$ for a predetermined time period so that motor M continues to rotate for a short time after cam disc 9 reaches the position shown in FIG. 1 thereby permitting the device to be actuated continuously without the necessity of closing siwtch S.

Figure 8:
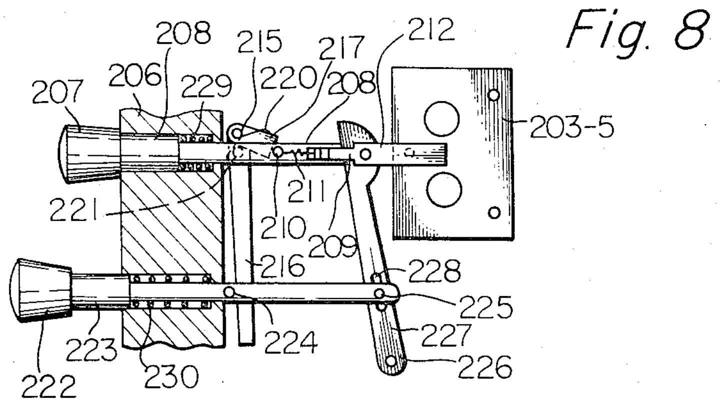
FIG. 8 is a schematic view partly in cross-section showing the general arrangement of a second embodiment of the device of the present invention.
Figure 9:
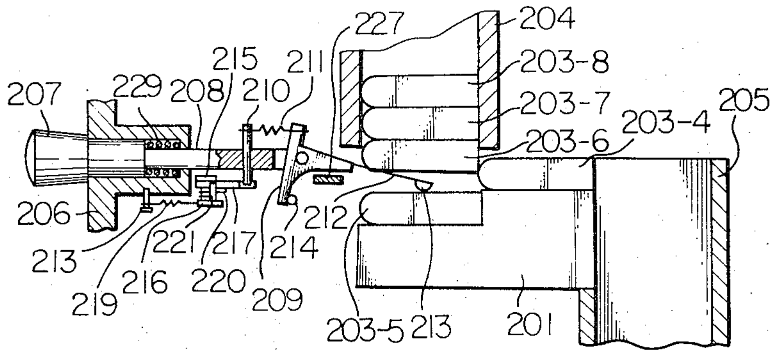
FIG. 9 is a view showing the device of FIG. 8 in a section perpendicular to the plane of FIG. 8.
Figure 10:
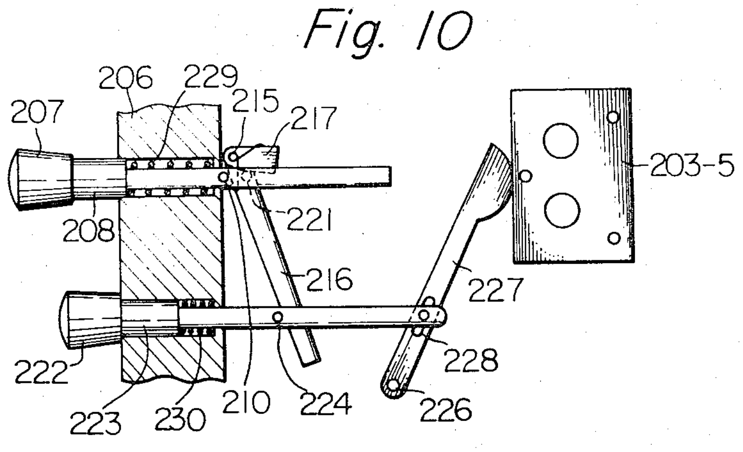
FIG. 10 is a view similar to FIG. 8 but showing the device of FIG. 8 in a different phase of the operation thereof.

FIGS. 8 – 10 show the second embodiment of the present invention. In this embodiment, parts 201 – 205 correspond to parts 1 – 5 in FIGS. 1 – 4, respectively.

Stem 208 of push button 207 is axially shiftably fitted in a hole provided in stationary frame panel 206 of the tape recorder. Push button 207 and stem 208 are urged toward the left by compression spring 229 and the leftward movement of stem 208 is limited by a pin 210 secured to stem 208 as shown in FIG. 10. T-shaped lever 209 is pivotally mounted on the inner end of stem 208 as shown in FIG. 9. Lever 209 is normally urged in the anticlockwise direction as seen in FIG. 9 by a spring 211, one end of which is secured to the free end of the upper arm of lever 209 while the other end is secured to pin 210. The anticlockwise rotation of lever 209 is limited by a pin 214 secured stationarily to the tape recorder and adapted to abut against the lower arm of lever 209 as shown in FIG. 9. Leaf spring 212 having a semi-spherical projection 213 at the free end thereof is secured to the stem of T-shaped lever 209 so as to extend toward the stack of cassettes housed in cassette supplying station 204.

The upper end of lever 216 and the left-hand end of pawl 217 are pivotally mounted on pivot shaft 215 fixedly secured to the tape recorder adjacent to panel 206 as shown in FIG. 8. Lever 216 is normally urged in the clockwise direction as seen in FIG. 8 by a spring 219, one end of which is secured to lever 216 while the other end is secured to pin 213 which is in turn secured to panel 206 as shown in FIG. 9. The clockwise rotation of lever 216 is limited by a pin 224 secured to stem 223 of push button 222 which will be described below. Pawl 217 is normally urged in the clockwise direction by a spring 220 provided around pivot shaft 215 with the free ends thereof secured to lever 216 and pawl 217, respectively. Pin 221 secured to lever 216 serves to limit the clockwise rotation of pawl 217 as shown in FIG. 8.

As shown in FIG. 8, when stem 208 is moved toward the right, pin 210 slides along the lower side of pawl 217 and is engaged with the free end of pawl 217 so that the leftward movement of stel 208 is prevented.

Steam 223 of push button 222 is axially shiftably fitted in a hole provided in panel 206 and is urged toward the left by a compression spring 230 as shown in FIGS. 8 and 10. The leftward movement of stem 223 is limited by pin 224 as shown in FIG. 8 which also serves to limit the clockwise rotation of lever 216 as previously described.

Pin 225 is fixedly secured to the inner end of stem 223 and elongated hole 228 of swingable lever 227 pivoted about pivot shaft 226 is slidably engaged with pin 225 so that lever 227 is swung when push button 222 is axially moved. The free end of lever 227 is provided with a raised portion which is adapted to abut against the cassette loaded on the cassette supporting deck of the tape recorder and move the same out of the deck each time push button 222 is depressed so as to move stem 223 toward the right.

In operation, push button 207 is first depressed so as to engage pin 210 with the free end of pawl 217 so that push button 207 and stem 208 are held in the rightmost positions thereof as shown in FIG. 8. In this position, T-shaped lever 209 is rotated in the clockwise direction by the abutment of pin 214 against the lower arm of lever 209 as shown in FIG. 9 so that spring 212 secured to lever 209 urges cassette 203–5 now placed on the cassette supporting deck to its operative position for the operation of tape recorder 201 which is rendered to be operative only when a cassette together with the cassette supporting deck is moved to its operative position in the tape recorder as previously described.

In order to interchange the cassette, push button 222 is depressed. Then, lever 216 is swung in the anticlockwise direction by the abutment of pin 224 against lever 216 so that pawl 217 is disengaged from pin 210 thereby permitting stem 208 to be moved toward the left by spring 229 as shown in FIG. 10 so as to rotate lever 209 in the anticlockwise direction by spring 211 and move spring 212 out of the stacked cassettes in cassette supplying station 204. The anticlockwise rotation of lever 209 moves spring 212 upwardly so that spring 212 is ready to be inserted between the cassette placed on the cassette supporting deck of tape recorder 201 and the cassette placed thereon. By the removal of spring 212 out of the upper surface of cassette 203–5, cassette 203–5 is moved upwardly by the cassette supporting deck and the operation of the tape recorder is terminated, and, at the same time, lever 227 is swung toward the right by the engagement of pin 225 with elongated hole 228 so that cassette 203–5 now held in the lifted position is moved out of the deck and the preceding cassette 203– 4 is moved into cassette receiving station 205, while cassette 203–5 assumes the position in which the preceding cassette 203–4 has been located, and the suceeding cassette 203–6 is supplied onto the cassette supporting deck.

By releasing push button 222, the device assumes the initial position for the operation. By depressing push button 207, the next operation is commenced.

In the above description of the first and second embodiments, the cassettes stacked in the cassette supplying station are fed successively by the action of the gravity of the cassettes, however, spring means may be provided which urges the stacked cassettes in the cassette supplying station downwardly so as to insure the positive feeding of the respective cassette onto the cassette supporting deck of the tape recorder.

Also, the tape recorder may be located in an inclined position insofar as the cassette can be supplied onto the cassette supporting deck by the gravity or by the spring means.

FIGS. 11 – 14 show the third embodiment of the present invention.

In this embodiment, the tape recorder 301 is so located in an inclined position that the cassette is loaded on the cassette supporting deck by moving the cassette from the left toward the right in the direction perpendicular to the deck with the cassette positioned in parallel to the deck as shown in FIGS. 11 – 15.

Parts 301 – 303 correspond to parts 1 – 3 shown in FIGS. 1 – 4. Cassette supplying station 304 is pivoted about pivot shaft 305. Cassette supplying station 304 is normally urged in the anticlockwise direction by a spring 311 one end of which is secured to station 304 while the other end is secured to a stationary portion 310 in the device. Station 304 is provided with cassette storing portion 304*a*, manually operable portion 304*b* at its upper portion. The stacked cassettes in storing portion 304*a* can be successively fed into the chute portion of station 304. One side wall of the chute portion adjacent to the tape recorder is broken so as to permit cassette supporting deck 302 to be moved into the chute portion while the opposite side wall of the chute portion is provided with an opening 304*c* substantially in alignment with cassette supporting deck 302 when the same is moved into the chute portion of station 304.

A stationary cassette pushing member 306 is provided which passes through opening 304*c* when station 304 is rotated in the clockwise direction by means of manually operable portion 304*b* against the action of spring 311, so that a cassette located in the chute portion can be moved apart from the opposite side wall of the chute portion.

Cassette holding plate 307 having an arcuate cassette holding lug 307*a* at the free end thereof is pivotally mounted by pivot shaft 308 at the lower end of the opposite side wall of the chute portion of station 304. Arcuate cassette holding lug 307*a* passes through opening 304*d* formed in the opposite side wall and cassette holding plate 307 is normally urged in the clockwise direction by means of spring 309 provided around pivot shaft 308 so that a cassette in the chute portion can be held by cassette holding lug 307*a* when the same projects inwardly of the chute portion through opening 304*d* by the action of spring 309 when station 304 is rotated in the clockwise direction from the position shown in FIG. 11 to the position shown in FIG. 12.

Figures 11, 12:
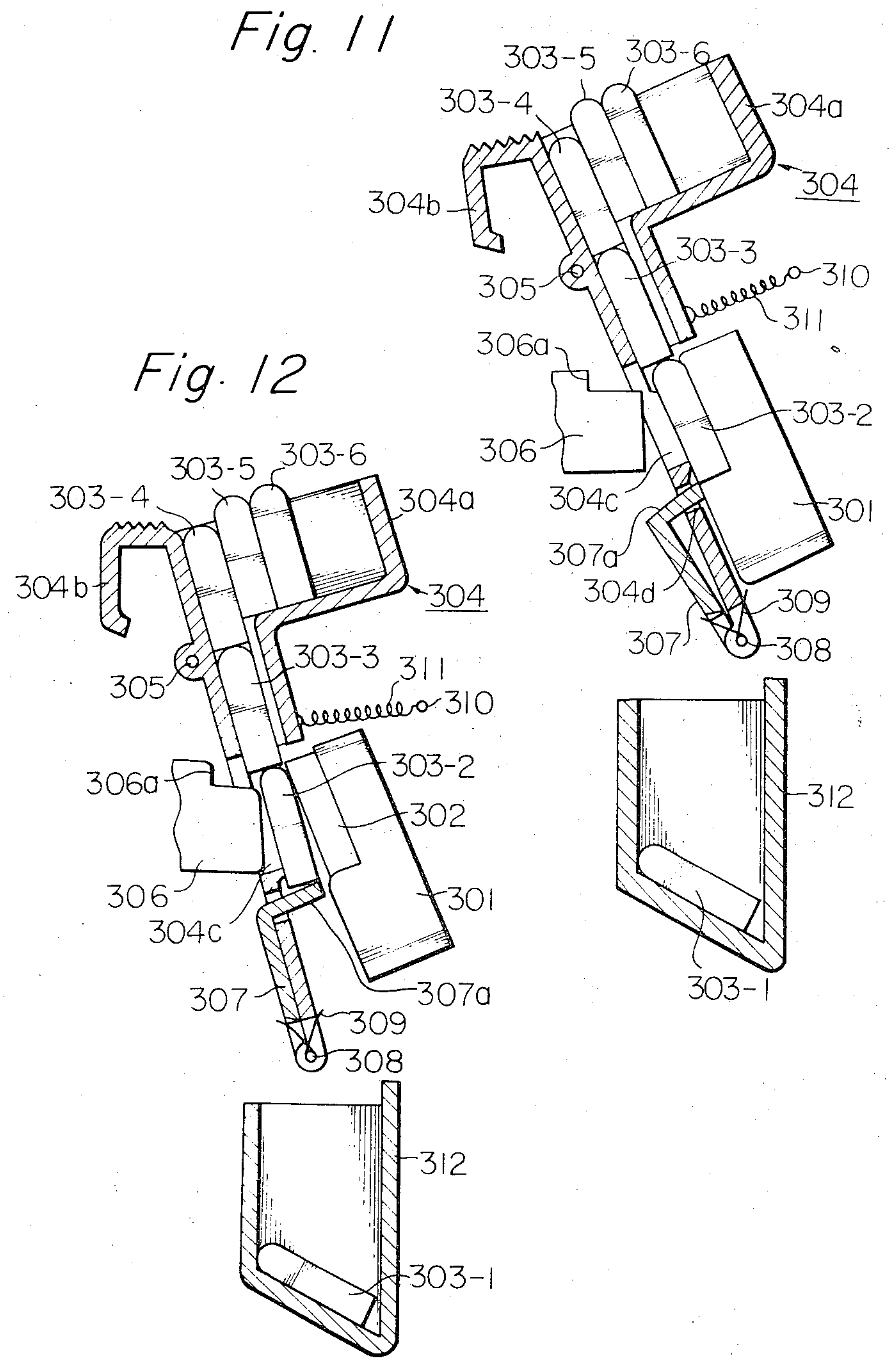
FIG. 11 is a schematic sectional view showing the general arrangement of a third embodiment of the device of the present invention.
FIGS. 12 to 15 are views similar to FIG. 11 but showing the device of FIG. 11 in the different phases of the operation thereof.

Cassette receiving station 312 is located beneath cassette holding plate 307 as shown in FIG. 11.

Cassette pushing member 306 is provided with a shoulder 306*a* which abuts against the opposite wall of the chute portion of station 304 when the same is rotated in the clockwise direction so as to limit the clockwise rotation of the station 304.

The operation of the device is as follows.

FIG. 11 shows the position in which cassette 303–2 is in operation. When it is desired to stop the operation of cassette 303–2 or the operation thereof is terminated, manually operable portion 304*b* is pushed so as to rotate cassette supplying station 304 in the clockwise direction against the action of spring 311. Thus, cassette 303–2 which has been urged inwardly of tape recorder 301 to the operative position thereof by the raised portion formed in the inner surface of the opposite side wall of the chute portion adjacent to opening 304*c* is released from the raised portion so as to be moved outwardly of tape recorder 301 by the action of cassette supporting deck 302 as shown in FIG. 12 so that the operation of the tape recorder is terminated. At the same time, cassette holding plate 307 is rotated in the clockwise direction by the action of spring 309 thereby permitting cassette 303–2 to be held by cassette holding lug 307*a* which projects inwardly of the chute portion through opening 304*d* as shown in FIG. 12. By the further clockwise rotation of station 304 by means of manually operable portion 304b to the position shown in FIG. 13, cassette pushing member 306 is moved into the chute portion through opening 304c relatively thereto so as to push cassette 303–2 out of cassette holding lug 307a so that cassette 303–2 falls into cassette receiving station 312 so as to be stacked onto the already received cassette 303–1, while the succeeding cassette 303–3 is held on cassette pushing member 306.

Figures 13, 14:
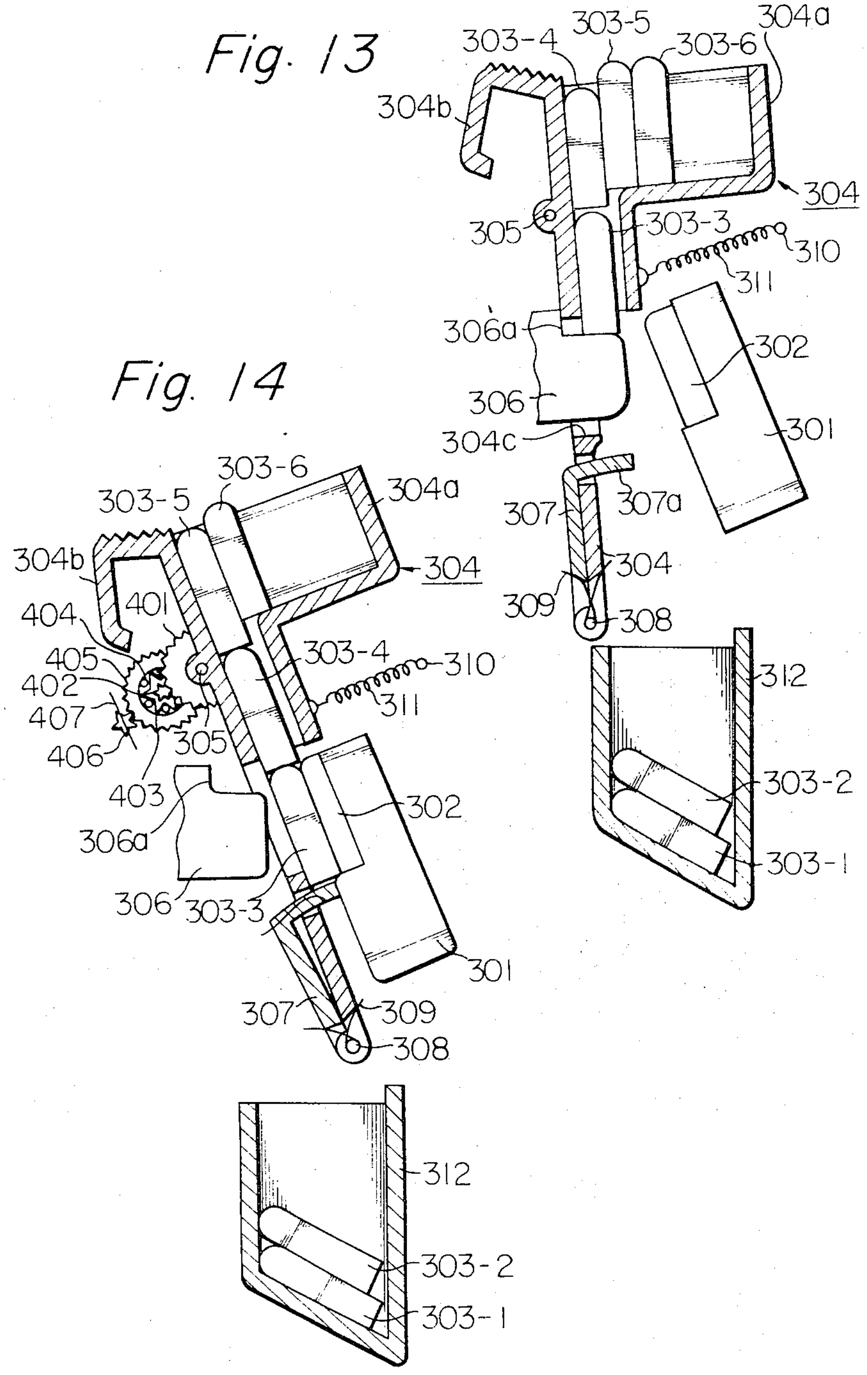

Click stop means may be advantageously provided so as to maintain cassette supplying station 304 in the position shown in FIG. 13.

In order to commence the operation of the succeeding cassette 303–3, manually operable portion 304b is slightly pulled by hand so as to rotate station 304 in the anticlockwise direction. Then, station 304 continues to rotate in the anticlockwise direction by the action of spring from the position shown in FIG. 13 through the position shown in FIG. 14 to the position shown in FIG. 11. During the anticlockwise rotation of station 304, cassette 303-3 is disengaged from member 306 and moved downwardly by the gravity or by spring means (not shown) and held in the position in alignment with deck 302 by means of cassette holding lug 307a as shown in FIG. 14 and then urged inwardly of tape recorder 301 together with deck 302 to the operative position thereof by means of the raised portion formed in the opposite side wall of the chute portion of station 304 as shown in FIG. 11. In this position, cassette holding plate 307 is swung in the anticlockwise direction by the abutment of lug 307a against tape recorder 301.

In order to slow down the returning movement of station 304 by the action of spring 311 so as to insure the positive feeding of the cassette onto lug 307a so that the cassette is held properly in alignment of with deck 302, governor means may be provided to control the returning movement of station 304 as shown in FIG. 14. The governor means comprises sector gear 401 secured to station 304 with its rotational center coinciding with pivot shaft 305, a pinion 402 rotatable about a stationary axis and meshing with sector gear 401, one-way clutch disc 403 integral with pinion 402, a plurality of clutch pieces 404 cooperating with clutch disc 403, ring gear 405 cooperating with clutch pieces 404 so as to be driven only when station 304 is rotated in the anticlockwise direction, and a pinion 406 meshing with ring gear 405 and having clamping blades 407. Thus, when station 304 is moved in the anticlockwise direction to the position shown in FIG. 11, clamping blades 407 are driven through sector gear 401, pinion 402, clutch 403, 404, ring gear 405 and pinion 406 so that the rotational speed of station 304 is reduced to insure the proper operation thereof.

Figure 15:
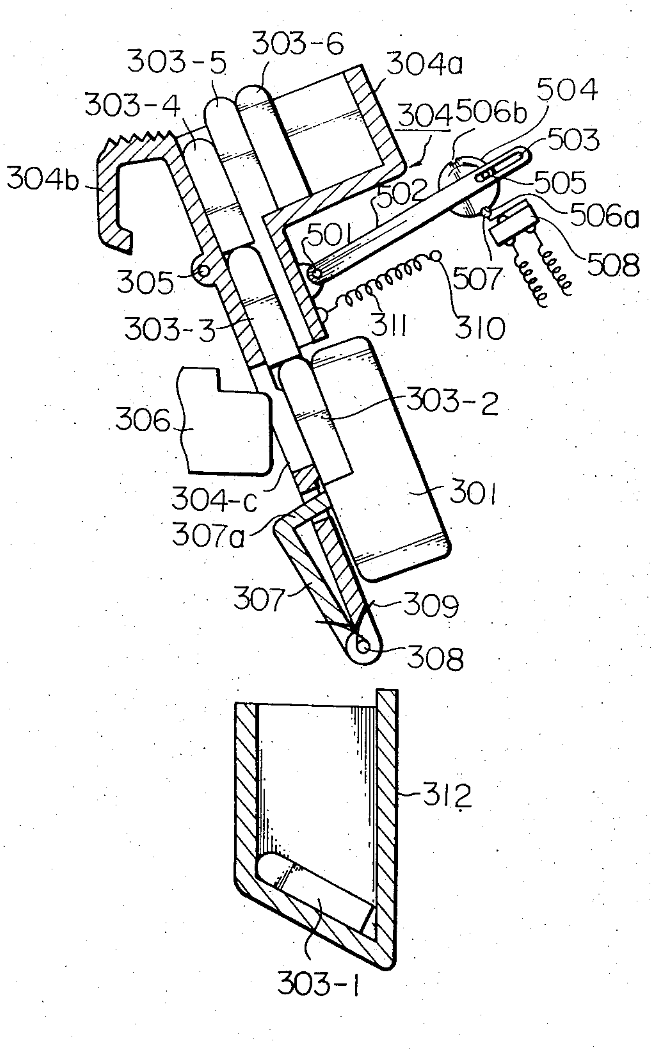

FIG. 15 shows a modification of the device of FIG. 11 in which mciroswitch 508 and cam disc 504 similar in construction and operation to microswitch 13 and cam disc 9 shown in FIG. 1, respectively, are provided so as to achieve the similar operation to that described in connection with FIGS. 1 – 5. In this case, a lever 502 is pivotally mounted on pivot shaft 501 secured to station 304 as shown in FIG. 15 and elongated hole 503 formed adjacent to the free end of lever 502 is slidably engaged with pin 505 secured to disc 504. Recesses 506a, 506b formed in the outer periphery of disc 504 cooperate with roller 507 of actuating arm of microswitch 508. The operation of the device is similar to that described in connection with FIGS. 1 – 5. This device can also be used together with the electric circuit shown in FIG. 6 so as to achieve the fully automatic interchanging of cassette similar to that described previously in connection with FIG. 6.

In the above description of the various embodiments of the present invention, the cassettes are described as being used for the reproduction of the informations recorded on the tape of the respective cassette, however, the cassettes may be used for recording the informations on the tape in the respective cassette in the present invention.

1. Apparatus for automatically interchanging tape cassettes in a tape recorder of the type that includes a spring-biassed, movable cassette-supporting deck, a cassette placed on said deck being played by said recorder by the process of urging said cassette, together with said deck, inwardly of said tape recorder, against the biassing force of said spring, to a predetermined position in said tape recorder; a cassette-supplying station positioned substantially directly above said deck for storing a plurality of unplayed cassettes in stacked relation and for successively supplying a bottom-most cassette in said stack to the deck of said recorder; wherein the improvement comprises means for urging said bottom-most cassette inwardly of said tape recorder, against the biassing force of said spring, and for subsequently ejecting said cassette, said urging means comprising:

a first lever, pivotally mounted at one end to said apparatus, for limited angular rotation about a center position which is substantially parallel to the principal longitudinal axis of said cassette-supplying station;

a second lever pivotally mounted at one end to the other end of said first lever;

first spring means for biassing said second lever in a counter-clockwise direction with respect to said first lever;

a third lever, pivotally mounted at one end to the other end of said second lever, said third lever having at said one end first and second extending portions, said first extending portion being substantially coaxial with the principal longitudinal axis of the third lever, said second extending portion being substantially orthogonal thereto;

second spring means, stronger than said first spring means for biassing said third lever in a counter-clockwise direction with respect to said second lever;

means, engaging the first extending portion of said third lever, for limiting rotation of said third lever to a position substantially co-axial with said second lever;

a leaf spring, mounted at one end to the other end of said third lever, and having a projection at the other end thereof, said spring abutting the lower surface of said cassette-supplying station when said first lever is at its extreme counter-clockwise limit of rotation, said second lever, third lever and leaf spring all being substantially parallel to the surface of said deck when the first lever is in a predetermined position;

a fourth lever, positioned proximate said deck, pivotally mounted at one end to said apparatus, and having an upwardly extending portion bearing a roller at said one end;

third spring means for biassing said fourth lever in a clockwise direction with respect to said apparatus;

means, engaging the lower surface of said fourth lever, for limiting clockwise rotation thereof so that said upwardly extending portion is substantially orthogonal to said third lever; and means for rotating said first lever towards said deck to cause said leaf spring to enter between said bottom-most cassette and the immediately preceding cassette, the second extending portion of said third lever engaging the roller on the upwardly extending portion of said fourth lever, thereby rotating said third lever clockwise, against the bias of said second spring means, and causing the projection on said leaf spring to force said bottom-most cassette inwardly of said deck to play said cassette.

2. The apparatus according to claim 1, wherein said rotating means comprises:

an electric motor;

a cam on the shaft of said motor and having a pin engaging a longitudinal slot in said first lever, said cam having first and second spaced-apart detents therein;

a microswitch, serially connected in the power circuit for said motor, said microswitch being actuated by a cam follower engaging said cam, rotation of said motor rotating said first lever towards said deck to urge said bottom-most cassette inwardly of said deck, the engagement of said cam follower with said second detent actuating said microswitch to open the power circuit to said motor, thereby interrupting further rotation of said first lever to permit said cassette to be played.

3. The apparatus according to claim 2, further comprising:

manually operated switch means, connected in parallel with said microswitch, for initiating an operating cycle or rejecting a currently played cassette, regardless of the condition of said microswitch.

4. The apparatus according to claim 2, further comprising:

means, positioned proximate the tape within the cassette currently being played, for detecting a conductive region on said tape;

amplifying relay means, connected to said detecting means, for amplifying the output therefrom and for presenting a relay closure across said microswitch, whereby said cassette is automatically rejected at the end of play thereof.

5. The apparatus according to claim 4, further comprising:

a delay circuit interposed between said relay means and said microswitch to provide a delay between the time said detecting means senses the end of play of a cassette and the time said cassette is rejected.

* * * * *